United States Patent
Sjöholm et al.

(10) Patent No.: US 9,909,546 B2
(45) Date of Patent: Mar. 6, 2018

(54) FUEL VALVE FOR INJECTING GASEOUS FUEL INTO A COMBUSTION CHAMBER OF A SELF-IGNITING INTERNAL COMBUSTION ENGINE, ENGINE, METHOD AND USE

(71) Applicant: MAN Diesel & Turbo, filial af MAN Diesel & Turbo SE, Tyskland, Copenhagen SV (DK)

(72) Inventors: Johan Sjöholm, Furulund (SE); Johan Hult, Ljungby (SE)

(73) Assignee: MAN DIESEL & TURBO, FILIAL AF MAN DIESEL & TURBO SE, TYSKLAND, Copenhagen SV (DK)

( * ) Notice: Subject to any disclaimer, the term of this patent is extended or adjusted under 35 U.S.C. 154(b) by 0 days.

(21) Appl. No.: 15/033,137

(22) PCT Filed: Oct. 17, 2014

(86) PCT No.: PCT/DK2014/050339
§ 371 (c)(1),
(2) Date: Apr. 29, 2016

(87) PCT Pub. No.: WO2015/062607
PCT Pub. Date: May 7, 2015

(65) Prior Publication Data
US 2016/0258400 A1  Sep. 8, 2016

(30) Foreign Application Priority Data

Oct. 30, 2013  (DK) .................................. 2013 00617

(51) Int. Cl.
*F02M 43/04*  (2006.01)
*F02M 61/04*  (2006.01)
(Continued)

(52) U.S. Cl.
CPC ......... *F02M 43/04* (2013.01); *F02D 19/0689* (2013.01); *F02D 19/0694* (2013.01);
(Continued)

(58) Field of Classification Search
CPC ............... F02M 43/04; F02M 21/0209; F02M 21/0212; F02M 21/0266; F02M 21/0263;
(Continued)

(56) References Cited

U.S. PATENT DOCUMENTS

| 4,185,779 A | 1/1980 | Watson |
| 4,691,674 A | 9/1987 | Otsuka et al. |

(Continued)

FOREIGN PATENT DOCUMENTS

| AU | 2007200381 A1 | 3/2007 |
| CA | 2442601 A1 | 12/2003 |

(Continued)

OTHER PUBLICATIONS

International Search Report for International Application No. PCT/DK2014/050339, mailed Jan. 23, 2015, 2 pages.

(Continued)

*Primary Examiner* — Hieu T Vo
*Assistant Examiner* — Arnold Castro
(74) *Attorney, Agent, or Firm* — Ziegler IP Law Group, LLC

(57) ABSTRACT

A fuel valve (50) for injecting gaseous fuel into the combustion chamber of a self-igniting internal combustion engine. The fuel valve (50) comprises an elongated fuel valve housing (52) with a rear end and a front end, a nozzle (54) with an elongated nozzle body with a hollow interior that forms a chamber (55) connected to nozzle holes (56), the nozzle (54) being arranged at the front end of the fuel valve housing (52), a gaseous fuel inlet port (53) in the elongated fuel valve housing (52) for connection to a source (Continued)

(60) of high pressure gaseous fuel, an ignition liquid inlet port (78,98) for connection to a source of ignition liquid (57), means (61,69,53,58,61,69) for establishing a timed fluidic connection between the gaseous fuel inlet port and the ignition space (55), and means (61,67,69,76,79,85,98, 99) configured for a timed delivery of a finite volume of ignition liquid to the chamber (55) for igniting the gaseous fuel inside the chamber (55).

27 Claims, 9 Drawing Sheets

(51) Int. Cl.
    *F02M 61/10*     (2006.01)
    *F02M 57/02*     (2006.01)
    *F02M 21/02*     (2006.01)
    *F02D 19/06*     (2006.01)
    *F02D 19/10*     (2006.01)
    *F02B 25/04*     (2006.01)

(52) U.S. Cl.
    CPC ......... *F02D 19/10* (2013.01); *F02M 21/0209* (2013.01); *F02M 21/0212* (2013.01); *F02M 21/0263* (2013.01); *F02M 21/0266* (2013.01); *F02M 21/0275* (2013.01); *F02M 57/026* (2013.01); *F02B 25/04* (2013.01); *Y02T 10/32* (2013.01); *Y02T 10/36* (2013.01)

(58) Field of Classification Search
    CPC .. F02M 21/0275; F02M 57/026; F02D 19/10; F02D 19/0689; F02D 19/0694; Y02T 10/32; Y02T 10/36; F02B 25/04
    USPC .............................. 123/27 GE, 525–527, 304
    See application file for complete search history.

(56) References Cited

U.S. PATENT DOCUMENTS

| | | | |
|---|---|---|---|
| 4,782,794 A | | 11/1988 | Hsu et al. |
| 4,966,103 A | | 10/1990 | Schaub et al. |
| 6,073,862 A | * | 6/2000 | Touchette ............... F02D 19/10 239/408 |
| 2006/0086825 A1 | * | 4/2006 | Date ...................... F02M 43/04 239/408 |
| 2009/0020631 A1 | | 1/2009 | Mashida et al. |
| 2009/0150050 A1 | * | 6/2009 | Mashida ............. F02D 19/0631 701/103 |
| 2010/0199948 A1 | | 8/2010 | Rogak et al. |
| 2011/0108631 A1 | * | 5/2011 | Mumford ........... F02M 21/0263 239/5 |
| 2012/0187218 A1 | | 7/2012 | Kim et al. |
| 2013/0081593 A1 | * | 4/2013 | Coldren ............. F02M 63/0045 123/304 |
| 2013/0098333 A1 | | 4/2013 | Kim et al. |
| 2014/0123948 A1 | | 5/2014 | Mittal |
| 2014/0216405 A1 | * | 8/2014 | Kato ..................... F02M 53/02 123/445 |

FOREIGN PATENT DOCUMENTS

| | | |
|---|---|---|
| EP | 0778410 A1 | 6/1997 |
| EP | 2541037 A2 | 1/2013 |
| EP | 2578867 A1 | 4/2013 |
| EP | 2604847 A2 | 6/2013 |
| EP | 2634414 A2 | 9/2013 |
| EP | 2868911 A1 | 5/2015 |
| FR | 2346556 A1 | 10/1977 |
| GB | 2051234 A | 1/1981 |
| JP | S61-96169 A | 5/1986 |
| JP | 2005-232988 A | 9/2005 |
| JP | 2011-252411 A | 12/2011 |
| JP | 2013-533433 A | 8/2013 |
| SU | 1240945 A1 | 6/1986 |
| SU | 1467243 A1 | 3/1989 |
| WO | 03104626 A1 | 12/2003 |

OTHER PUBLICATIONS

International Preliminary Report on Patentability received for International Patent Application PCT/DK2014/050339, dated Oct. 5, 2015, 11 pages.

* cited by examiner

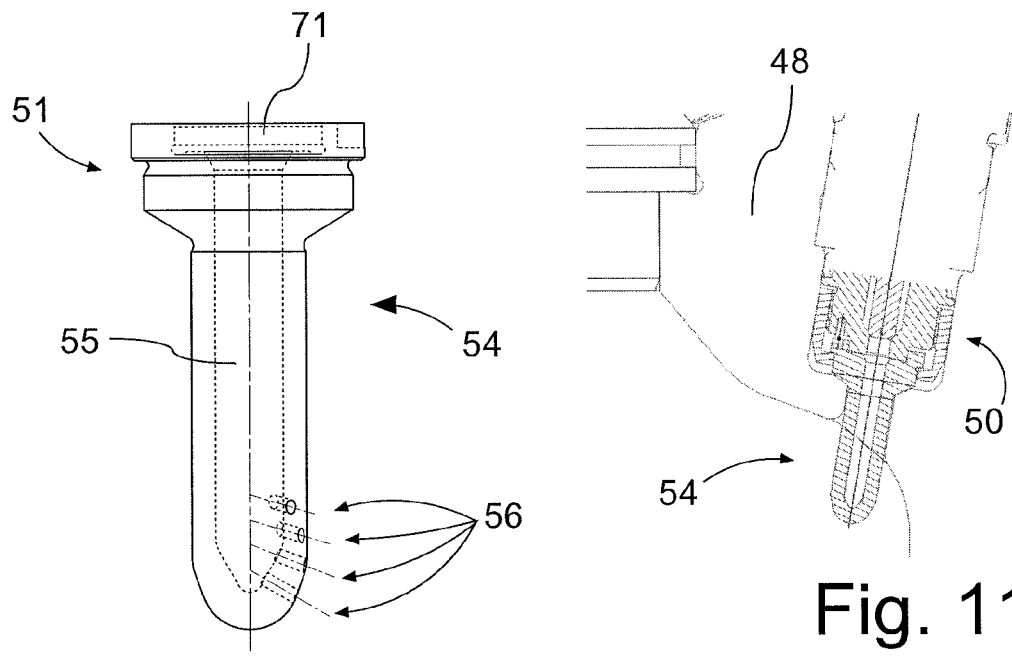
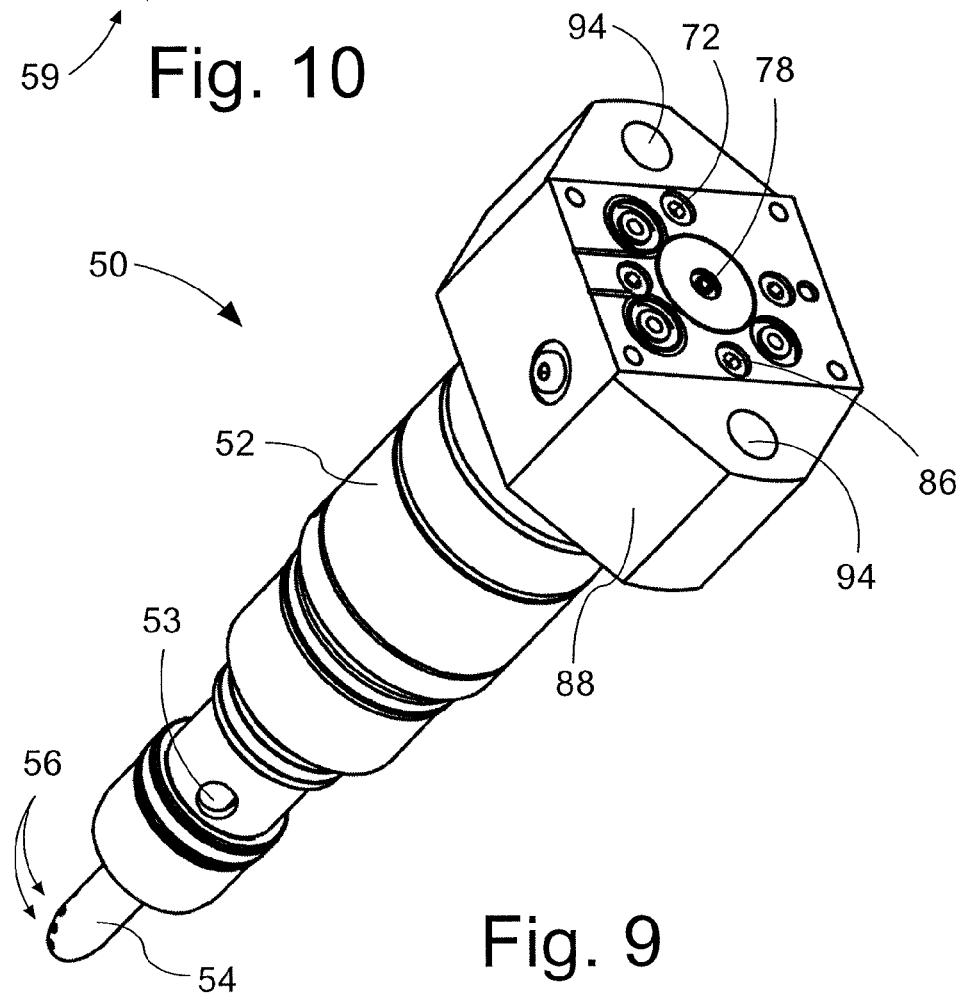

FUEL VALVE FOR INJECTING GASEOUS FUEL INTO A COMBUSTION CHAMBER OF A SELF-IGNITING INTERNAL COMBUSTION ENGINE, ENGINE, METHOD AND USE

FIELD OF THE INVENTION

The present invention relates to a gaseous fuel valve for a self-igniting internal combustion engine with a gaseous fuel supply system, in particular to a gaseous fuel valve for a large low-speed uniflow turbocharged two-stroke internal combustion engine with a gaseous fuel supply system.

BACKGROUND ART

Large low-speed two-stroke self-igniting (Diesel) engines of the crosshead type are typically used in propulsion systems of large ships or as prime mover in power plants. Very often, these engines are operated with heavy fuel oil or with fuel oil.

Recently, there has been a demand for large two-stroke diesel engines to be able to handle alternative types of fuel, such as gas, coal slurry, petroleum coke and the like, in particular gas.

Gaseous fuels, such as natural gas are relatively clean fuels that result in significantly lower levels of sulfurous components, NOx and CO2 in the exhaust gas when used as fuel for a large low-speed uniflow turbocharged two-stroke internal combustion engine when compared with e.g. using heavy fuel oil as fuel.

However, there are problems associated with using a gaseous fuel in a large low-speed uniflow turbocharged two-stroke internal combustion engine. One of those problems is the willingness and predictability of gas to self-ignite upon injection into the combustion chamber and both are essential to have under control in a self-igniting engine. Therefore, existing large low-speed uniflow turbocharged two-stroke internal combustion engines use pilot injection of oil or other ignition liquids simultaneously with the injection of the gaseous fuel to ensure reliable and properly timed ignition of the gaseous fuel.

Large low-speed uniflow turbocharged two-stroke internal combustion engines are typically used for the propulsion of large ocean going cargo ships and reliability is therefore of the utmost importance. Gaseous fuel operation of these engines is still a relatively recent development and reliability of the operation with gas has not yet reached the level of conventional fuel. Therefore, existing large low-speed two-stroke diesel engines are all dual fuel engines with a fuel system for operation on gaseous fuel and a fuel system for operation with fuel oil so that they can be operated at full power running on the fuel oil only.

Due to the large diameter of the combustion chamber of these engines, they are typically provided with three fuel injection valves per cylinder, separated by an angle of approximately 120° around the central exhaust valve. Thus, with a dual fuel system there will be three gaseous fuel valves per cylinder and three fuel oil valves per cylinder with one fuel oil injection valve placed close to a respective gas injection valve so as to ensure reliable ignition of the gaseous fuel and thus, the top cover of the cylinder is a relatively crowded place.

In the existing dual fuel engines the fuel oil valves have been used to provide pilot oil injection during operation with gaseous fuel. These fuel oil valves are dimensioned so as to be able to deliver fuel oil in an amount required for operating the engine at full load on fuel oil only. However, the amount of oil injected in a pilot injection should be as small as possible to obtain the desired reduction in emissions. Dosage of such a small amount with a full size fuel injection system that can also deliver the large amount necessary for operation at full load poses significant technical problems, and is in practice very difficult to achieve and therefore the pilot oil dosage has in existing engines been with a larger quantity per fuel injection event than desirable, especially at medium and low load. The alternative of an additional small injection system that can handle the small pilot amount is a considerable complication and cost up. Further, additional small pilot oil injection valves render the top cover of the cylinder even more crowded.

DISCLOSURE OF THE INVENTION

On this background, it is an object of the present application to provide a fuel valve for a self-igniting internal combustion engine that overcomes or at least reduces the problems indicated above.

This object is according to one aspect achieved by providing a fuel valve for injecting gaseous fuel into a combustion chamber of a self-igniting internal combustion engine, the fuel valve comprises an elongated fuel valve housing with a rear end and a front end, a nozzle with an elongated nozzle body with a hollow interior that forms a chamber connected to nozzle holes, the nozzle being arranged at the front end of the fuel valve housing, a gaseous fuel inlet port in the elongated fuel valve housing for connection to a source of high pressure gaseous fuel, an ignition liquid inlet port for connection to a source of ignition liquid, means for establishing a timed fluidic connection between the gaseous fuel inlet port and the chamber, and means configured for a timed delivery of a finite volume of ignition liquid to the chamber for igniting the gaseous fuel inside the chamber.

By a delivery of a finite volume of ignition liquid to chamber in the nozzle a reliable and controlled ignition of the gaseous fuel inside the chamber in the nozzle can be achieved, while using simple means for delivering the ignition liquid and with small consumption of ignition liquid thereby improving emission levels.

In a first possible implementation of the first aspect the means configured for a timed delivery of a finite volume of ignition liquid to the chamber is configured to deliver a controlled volume of ignition liquid.

In a second possible implementation of the first aspect the finite and controlled amount of ignition liquid is significantly less than the volume of the chamber.

In a third possible implementation of the first aspect the fuel valve is configured to deliver the finite volume of ignition liquid to the chamber just ahead of the gaseous fuel.

In a fourth possible implementation of the first aspect the fuel valve is configured to deliver the finite volume of ignition liquid to the chamber at the start of the delivery of the gaseous fuel.

In a fifth possible implementation of the first aspect the finite volume of ignition liquid is added to the gaseous fuel before admission of the gaseous fuel to the chamber and wherein the gaseous fuel and the ignition liquid enter the chamber via one and the same port.

In a sixth possible implementation of the first aspect the finite volume of ignition liquid and the gaseous fuel are delivered to the chamber via separate ports.

In a seventh possible implementation of the first aspect the chamber has an elongated shape with one longitudinal end forming an inlet port for gaseous fuel and ignition liquid and the nozzle holes connect to the chamber near the other longitudinal end of the chamber.

In an eight possible implementation of the first aspect the nozzle is configured to be operated with a temperature above 300° C.

The object above is also achieved according to a second aspect by providing a self-igniting internal combustion engine with a plurality of cylinders, a high pressure gaseous fuel supply system, a high pressure ignition liquid supply system and one or more gaseous fuel valves according to any one of claims 1 to 9 provided at the cylinders of the engine and the gaseous fuel valves being connected to the high pressure gaseous fuel supply system and to the ignition liquid supply system.

In a first possible implementation of the second aspect the engine is configured to self-ignite the injected gaseous fuel with the help of the ignition liquid and without the use of other ignition equipment.

In a second possible implementation of the second aspect the engine is configured to ignite the gaseous fuel upon entry of the gaseous fuel in chamber inside a nozzle.

In a third possible implementation of the second aspect the source of gaseous fuel delivers the gaseous fuel at high pressure to the fuel valves, and wherein the source of ignition liquid is configured to deliver the ignition liquid at a pressure that is higher than the pressure of the source of gaseous fuel.

The object above is also achieved according to a third aspect by providing a method for injecting and igniting gaseous fuel in a self-igniting internal combustion engine with a fuel valve for injecting gaseous fuel into the combustion chamber of the self-igniting internal combustion engine, the fuel valve comprising a nozzle with a hollow interior that forms a chamber and nozzle holes connecting to the chamber, the method comprising delivering high pressure gaseous fuel to the fuel valve, starting an injection event by timed opening of the fuel valve thereby allowing the gaseous fuel to flow to the combustion chamber via the chamber in the nozzle, delivering injection liquid to the chamber in the nozzle just before or during an injection event thereby assisting ignition of the gaseous fuel inside the chamber, and ending an injection event by closing the gas valve.

In a first possible implementation of the third aspect the method further comprises delivering the gaseous fuel at a first high pressure to the fuel valve and delivering the ignition fuel at a second high pressure to the fuel valve, the second high pressure being higher than the first high pressure.

In a second possible implementation of the third aspect the method further comprises blending the gaseous fuel and the ignition liquid before the start of an injection event and delivering the gaseous fuel and the ignition liquid simultaneously to the chamber In a third possible implementation of the third aspect the method further comprises delivering the gaseous fuel and the ignition liquid separately to the chamber.

The object above is also achieved according to a fourth aspect by providing a method of operating a self-igniting internal combustion engine, the method comprising supplying pressurized gaseous fuel at a first high pressure to a fuel valve of the engine, the fuel valve having a hollow nozzle with a plurality of nozzle holes connecting a chamber in the nozzle to a combustion chamber in a cylinder of the engine, supplying ignition liquid at a second high pressure to the fuel valve, the second high pressure being higher than the first high pressure, controlling the injection of gaseous fuel with a moveable valve needle that cooperates with a valve seat above the hollow nozzle, a fuel chamber being arranged above the valve seat, pressuring the fuel chamber with the gaseous fuel, starting a gaseous fuel injection event by lifting the axially moveable valve needle from the valve seat, delivering a volume of ignition liquid to the chamber just before or during an injection event, and ending the injection event by moving the axially moveable valve needle back to the valve seat.

In a first possible implementation of the fourth aspect the gaseous fuel ignites inside the chamber with the help of the ignition liquid.

In a second possible implementation of the fourth aspect the nozzle is kept above 300° C. throughout the engine cycle.

The object above is also achieved by in accordance with a fifth aspect by providing the use of vessel or engine lubricating or fuel oil as ignition liquid in a method for injecting and igniting gaseous fuel in a self-igniting internal combustion engine with a fuel valve for injecting gaseous fuel into the combustion chamber of the self-igniting internal combustion engine, the fuel valve comprising a nozzle with a hollow interior that forms a chamber and nozzle holes connecting to the chamber, the method comprising: delivering high pressure gaseous fuel to the fuel valve, starting an injection event by timed opening of the fuel valve thereby allowing the gaseous fuel to flow to the combustion chamber via the chamber in the nozzle, delivering injection liquid to the chamber in the nozzle just before or during an injection event thereby assisting controlled ignition of the gaseous fuel inside the chamber, and ending an injection event by closing the gas valve.

In a first implementation of the fifth aspect the method further comprises delivering the gaseous fuel at a first high pressure to the fuel valve and delivering the ignition fuel at a second high pressure to the fuel valve, the second high pressure being higher than the first high pressure.

In a second implementation of the fifth aspect the method further comprises blending the gaseous fuel and the ignition liquid before the start of an injection event and delivering the gaseous fuel and the ignition liquid simultaneously to the chamber.

In a third implementation of the fifth aspect the method further comprises delivering the gaseous fuel and the ignition liquid separately to the chamber.

In a fourth implementation of the fifth aspect the gaseous fuel ignites inside the chamber with the help of the ignition liquid.

In a fifth implementation of the fifth aspect the nozzle is kept above 300° C. throughout the engine cycle.

In a sixth implementation of the fifth aspect the ignition liquid has a viscosity in the range from 25 cSt to 750 cST, preferably between 75 cSt to 725 cSt, and most preferably between 150 cSt to 700 cSt.

In a seventh implementation of the fifth aspect the method further comprises ignition liquid has a flash point above 30° C., preferably above 45° C., and most preferably above 60° C.

Further objects, features, advantages and properties of the fuel valve, engine, methods, and use according to the present disclosure will become apparent from the detailed description.

BRIEF DESCRIPTION OF THE DRAWINGS

In the following detailed portion of the present description, the invention will be explained in more detail with reference to the exemplary embodiments shown in the drawings, in which:

FIG. 9 is an elevated view of the fuel valve of FIGS. 6 to 8, FIG. 10 is a sectional view of a nozzle for use with a fuel valve of FIGS. 6 to 9, FIG. 11 is a sectional view illustrating the position of the fuel valve of FIGS. 6 to 9 in a cylinder cover.

DETAILED DESCRIPTION OF PREFERRED EMBODIMENTS

Figure 1:
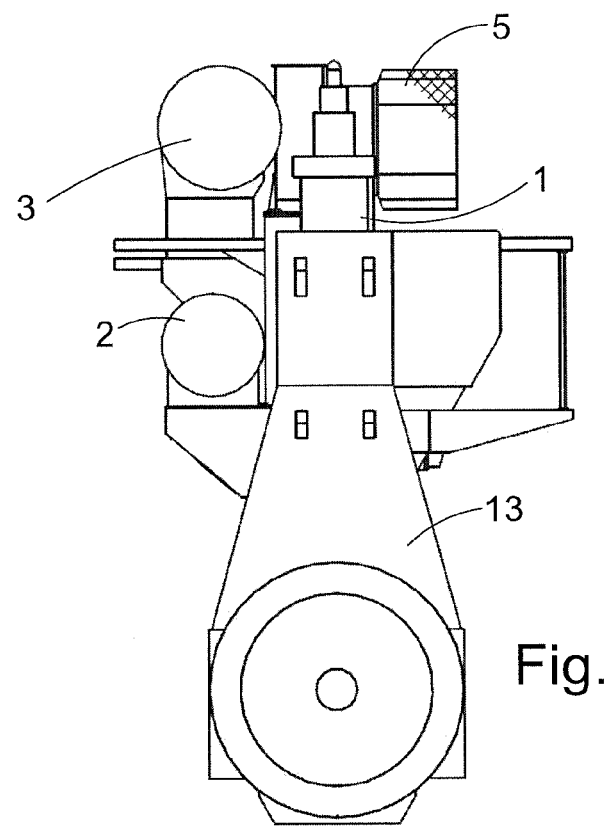
FIG. 1 is a front view of a large two-stroke diesel engine according to an example embodiment.
Figure 2:
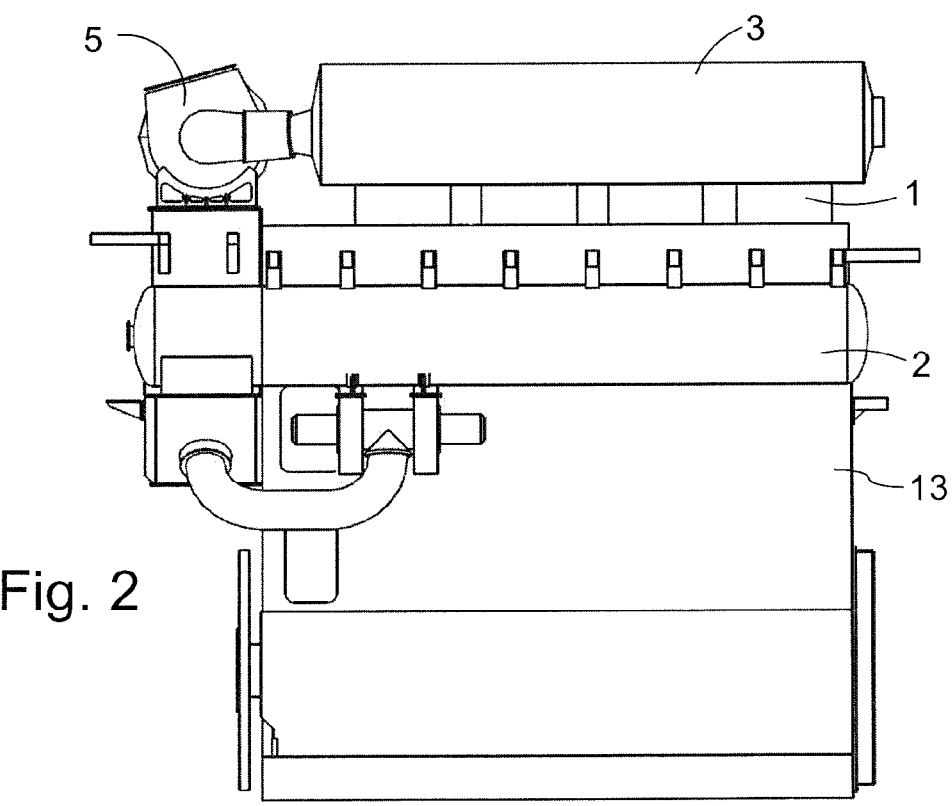
FIG. 2 is a side view of the large two-stroke engine of FIG. 1.
Figure 3:
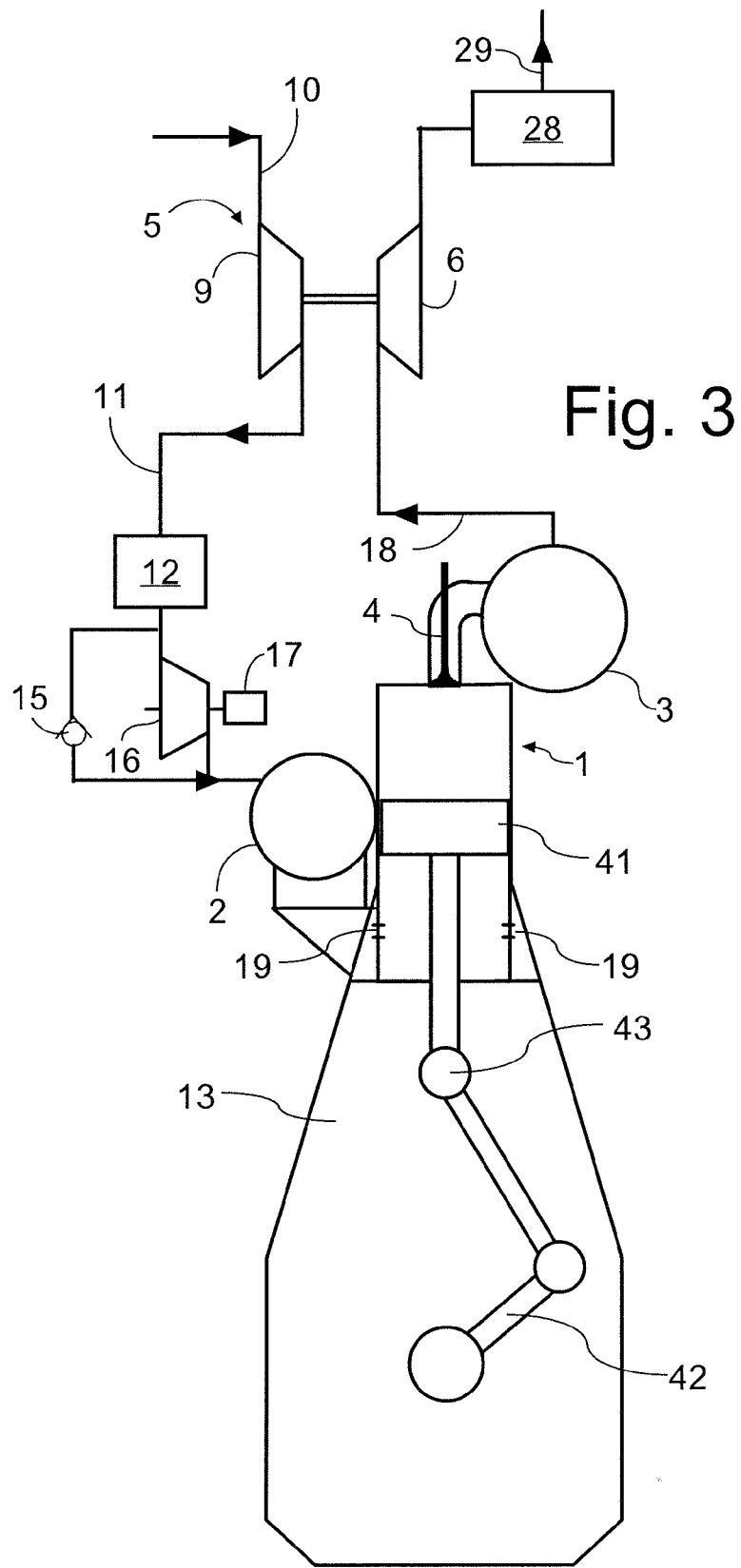
FIG. 3 is a diagrammatic representation the large two-stroke engine according to FIG. 1.

In the following detailed description, the self-igniting internal combustion engine will be described with reference to a large two-stroke low-speed turbocharged internal combustion (Diesel) engine in the example embodiments. FIGS. 1, 2 and 3 show a large low-speed turbocharged two-stroke diesel engine with a crankshaft 42 and crossheads 43. FIG. 3 shows a diagrammatic representation of a large low-speed turbocharged two-stroke diesel engine with its intake and exhaust systems. In this example embodiment the engine has four cylinders 1 in line. Large low-speed turbocharged two-stroke diesel engines have typically between four and fourteen cylinders in line, carried by an engine frame 13. The engine may e.g. be used as the main engine in an ocean going vessel or as a stationary engine for operating a generator in a power station. The total output of the engine may, for example, range from 1,000 to 110,000 kW. The engine is in this example embodiment a diesel engine of the two-stroke uniflow type with scavenge ports at the lower region of the cylinders 1 and a central exhaust valve 4 at the top of the cylinders 1. The scavenge air is passed from the scavenge air receiver 2 to the scavenge ports (not shown) of the individual cylinders 1. A piston 41 in the cylinder 1 compresses the scavenge air, fuel is injected from fuel injection valves in the cylinder cover, combustion follows and exhaust gas is generated. When an exhaust valve 4 is opened, the exhaust gas flows through an exhaust duct associated with the cylinder 1 into the exhaust gas receiver 3 and onwards through a first exhaust conduit 18 to a turbine 6 of the turbocharger 5, from which the exhaust gas flows away through a second exhaust conduit via an economizer 28 to an outlet 29 and into the atmosphere. Through a shaft, the turbine 6 drives a compressor 9 supplied with fresh air via an air inlet 10. The compressor 9 delivers pressurized scavenge air to a scavenge air conduit 11 leading to the scavenge air receiver 2.

The scavenge air in conduit 11 passes an intercooler 12 for cooling the scavenge air—that leaves the compressor at approximately 200° C.—to a temperature between 36 and 80° C.

The cooled scavenge air passes via an auxiliary blower 16 driven by an electric motor 17 that pressurizes the scavenge air flow when the compressor 9 of the turbocharger 5 does not deliver sufficient pressure for the scavenge air receiver 2, i.e. in low or partial load conditions of the engine. At higher engine loads the turbocharger compressor 9 delivers sufficient compressed scavenge air and then the auxiliary blower 16 is bypassed via a non-return valve 15.

Figure 4:
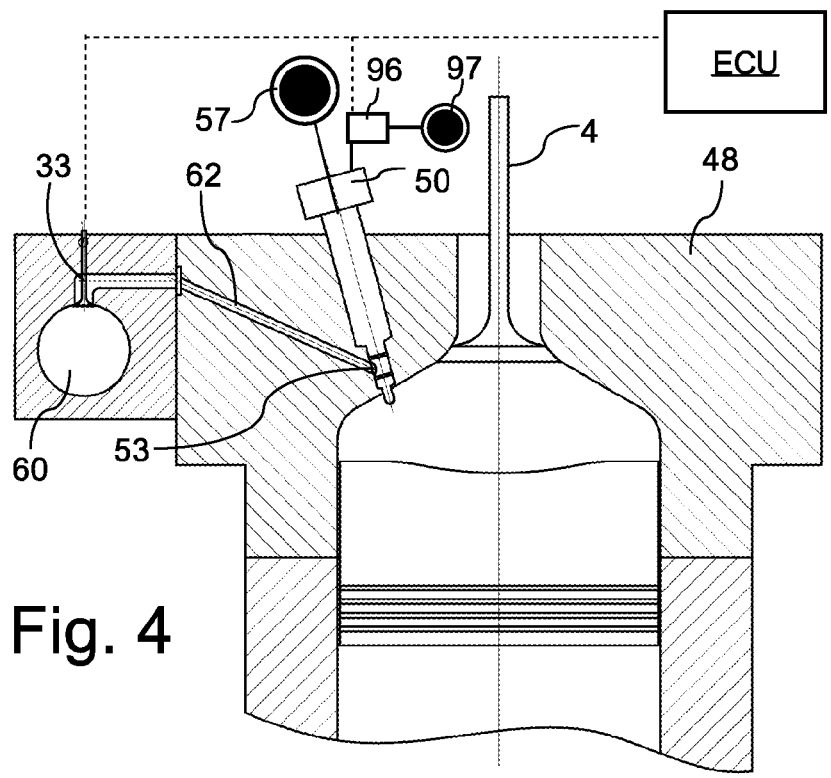
FIG. 4 is a sectional view in diagrammatic representation of an example embodiment of gaseous fuel system of the engine of FIG. 1 of the upper part of a cylinder.
Figure 5:
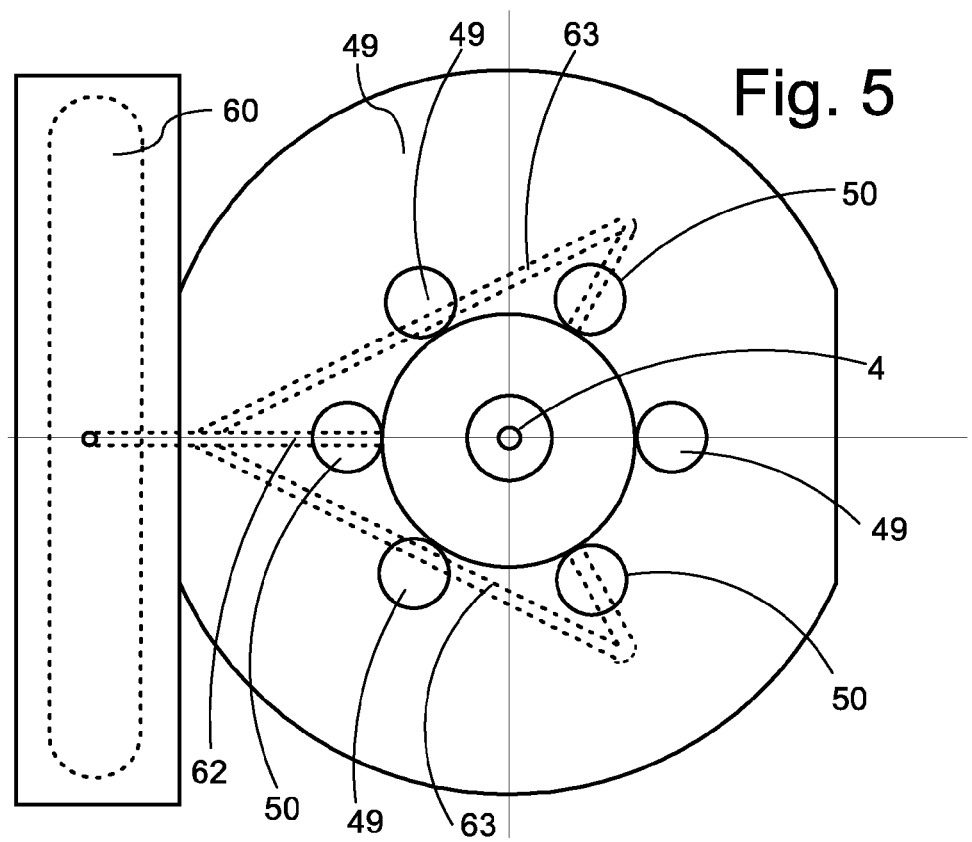
FIG. 5 is a top view in diagrammatic representation a cylinder and the gaseous fuel injection system of the embodiment of FIG. 4.

FIGS. 4 and 5 show the top of one of the plurality of cylinders 1 according to an example embodiment. The top cover 48 of the cylinders 1 is provided with three gaseous fuel valves 50 for injecting a gaseous fuel from an outlet of the fuel valves 50, such as a nozzle, into the combustion chamber in the cylinder 1. This example embodiment shows three gaseous fuel valves 50 per cylinder, but it should be understood that a single or two gaseous fuel valves may be sufficient, depending on the size of the combustion chamber. The gaseous fuel valve 50 has an inlet 53 connected to a gaseous fuel supply conduit 62 that supplies highly pressurized gaseous fuel to the gaseous fuel valve 50. One of the three gaseous fuel valves 50 is supplied by supply conduit 62, the other two gaseous fuel valves 50 are supplied by supply conduits 63. In this embodiment the supply conduits 62,63 are drilled holes in the top cover 48 that connect to a gas accumulator 60 associated with the cylinder 1. The gas accumulator 60 receives high pressure gas from a gas supply system (not shown) that includes gas tanks and high pressure pumps.

The gaseous fuel valve 50 also has an inlet connected to a source of pressurized ignition liquid 57 and is configured for delivering ignition liquid at high pressure that is higher than the pressure of the gaseous fuel by a more or less constant margin. The source of pressurized ignition liquid 57 has a pressure that is at least slightly above the pressure of the source of gaseous fuel 60. It is an advantage of the invention that ordinary vessel lubricating oils or fuel oils such as sealing oil, marine diesel, biodiesel, lubricating oil, heavy fuel oil or dimethyl ether (DME) may find additional use also as ignition liquid according to the present invention.

Each cylinder 1 is in this example embodiment provided with a gaseous fuel accumulator 60. The gaseous fuel accumulator 60 contains an amount of gaseous fuel under high pressure (e.g. approximately 300 bar) that is ready to be delivered to the fuel valves 50 of the cylinder 1. The gaseous fuel supply conduits 62,63 extend between the gaseous fuel accumulator 60 and a respective gaseous fuel valve 50 of the cylinder 1 concerned.

A window valve 33 is arranged at the outlet of the gaseous fuel accumulator 60 and the window valve 33 controls the flow of gaseous fuel from the gaseous fuel accumulator 60 to the gaseous fuel supply conduits 62,63.

Three fuel oil valves 49 are provided in the top cover 48 for operation of the engine on fuel oil. The fuel oil valves are connected to a source of high pressure fuel oil in a well-known manner. In an embodiment (not shown) the engine is configured for operation on gaseous fuel only and in this embodiment the engine does not have fuel valves.

The engine is provided with an electronic control unit ECU that controls the operation of the engine. Signal lines connect the electronic control unit ECU to the gaseous fuel valves 50, to the fuel oil valves 49 and to the window valves 33.

The electronic control unit ECU is configured to time the injection events for the gaseous fuel valve correctly and to control the dosage of the gaseous fuel with the gaseous fuel valves 50.

The electronic control unit ECU opens and closes the window valve 33 so as to ensure that the supply conduits 62,63 are filled with high pressure gaseous fuel before the start of the gaseous fuel injection event controlled by the gaseous fuel valve 50.

Figure 6:
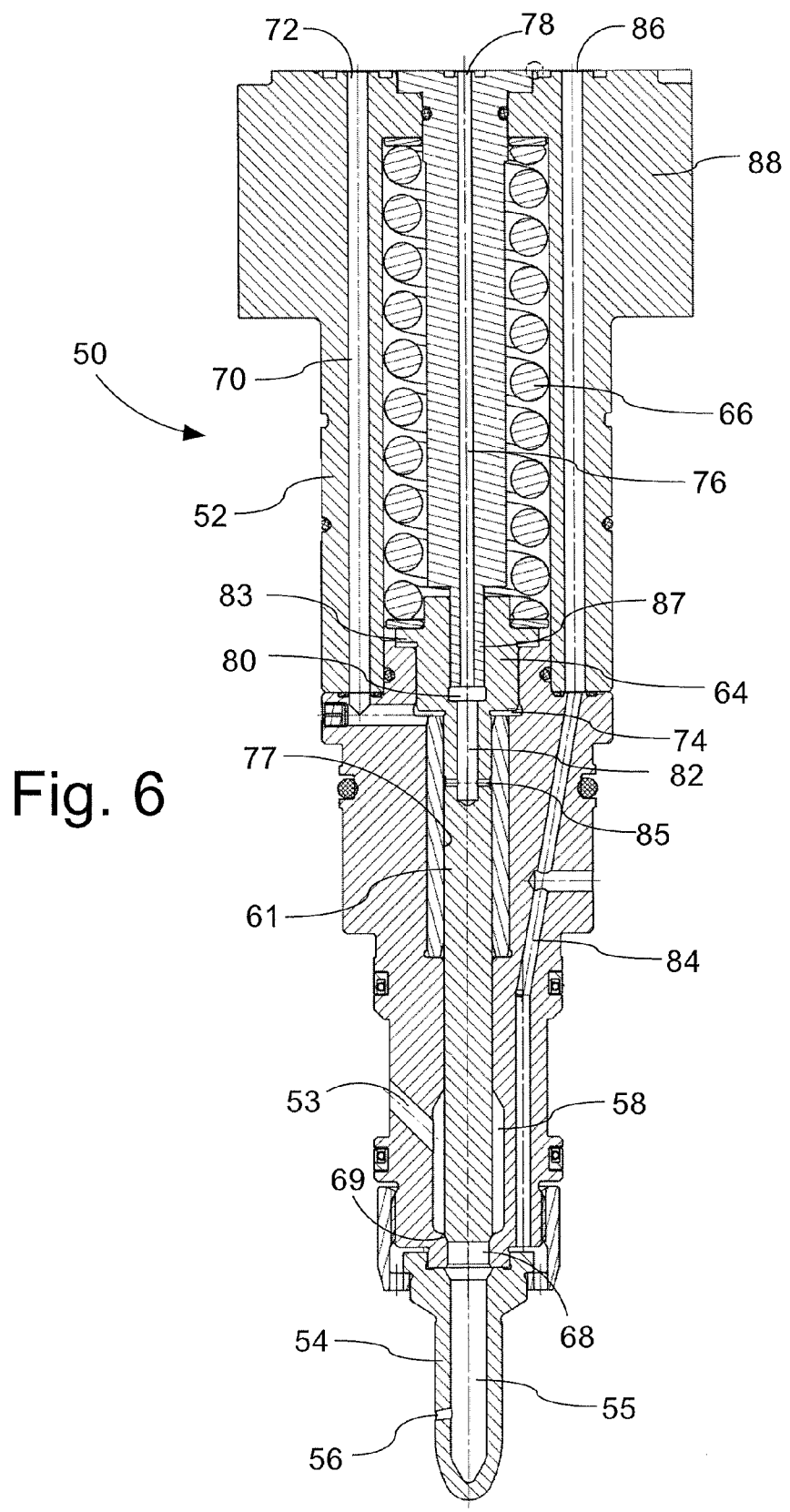
FIG. 6 is a sectional view of a gaseous fuel injection valve for use in the engine shown in FIG. 1 according to an example embodiment of the invention.
Figure 7:
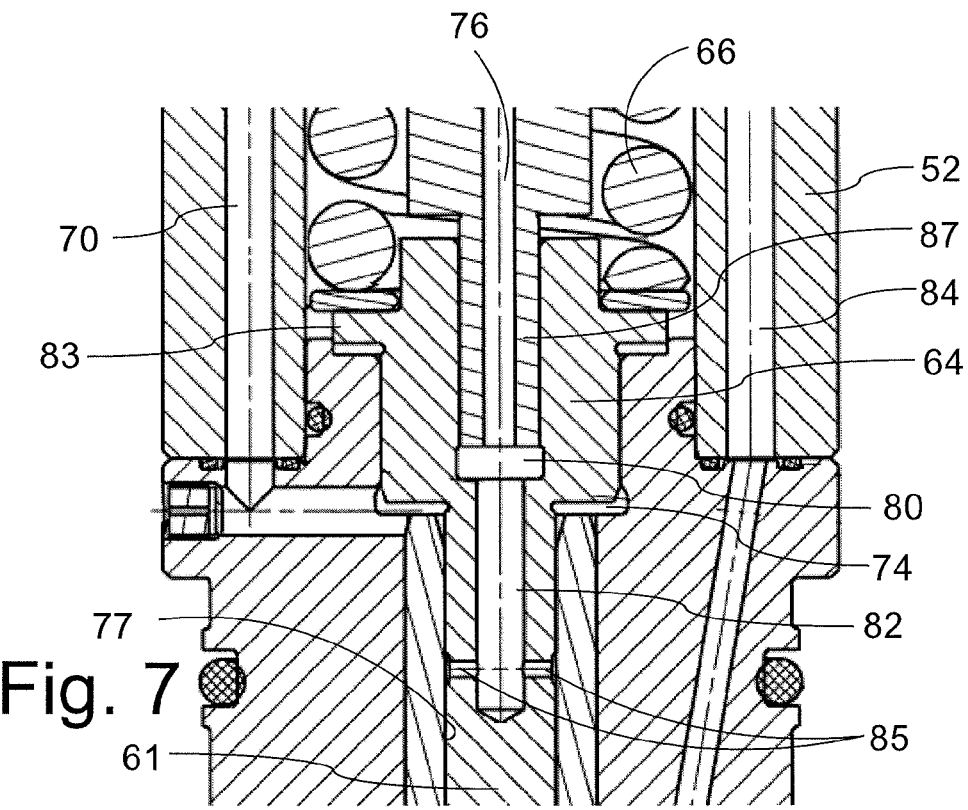
FIG. 7 is a detailed view of a section of FIG. 6.

FIGS. 6,7 and 9 show a fuel valve 50 for injecting gaseous fuel into the combustion chamber of a self-igniting internal combustion engine and for delivering ignition liquid. The fuel valve 50 has an elongated valve housing 52 with a rearmost end 88 and a nozzle 54 at the front end. The rearmost end 88 is provided with a plurality of ports, including a control port 72, an ignition liquid port 78 and gas leak detection port 86. The rearmost end 88 is enlarged to form a head and provided with bores 94 in the head for receiving bolts (not shown) that secure the fuel valve 50 in the cylinder cover 48. In the present embodiment, the fuel valves are placed around the central exhaust valve 4, i.e. relatively close to the walls of the cylinder liner. The elongated valve housing 52 and the other components of the fuel injection valve 50, as well as the nozzle are in embodiment made of steel, such as stainless steel.

The hollow nozzle 54 is provided with nozzle holes 56 that are connected to the hollow interior 55 (chamber or sac volume) of the nozzle and the nozzle holes 56 are distributed over the length and distributed radially over the nozzle 54. The nozzles are axially close to the tip and the radial distribution is in the present embodiment over a relatively narrow range of approximately 50° and the radial orientation of the nozzle holes is such that the nozzles are directed away from the walls of the cylinder liner. Further, the nozzles are directed such that they are roughly in the same direction as the direction of the swirl of the scavenge air in the combustion chamber caused by the configuration of the scavenge ports.

The tip 59 of the nozzle 54 (FIG. 10) is in this embodiment closed. The rear or base 51 of the nozzle 54 is connected to the front end of the housing 52 with a chamber 55 in the nozzle 54 opening towards the housing 52. In an embodiment the chamber 55 is a longitudinal bore extending from the closed tip to the base 51 and opening to the rear of the nozzle so as to connect with the opening/outlet port 68 in the front end of the elongated valve the housing 52 below the valve seat 69.

An axially displaceable valve needle 61 is slidably received with a precisely defined clearance in a longitudinal bore 77 in the elongated valve housing 52. The valve needle 61 has a tip that is configured to enter in a sealing engagement with a seat 69 that is formed in the elongated valve housing 52. In an embodiment the seat 69 is arranged close to the front end of the elongated valve housing 52. The elongated valve housing 52 is provided with a gaseous fuel inlet port 53 for connection to a source 60 of pressurized gaseous fuel, for example via the gaseous fuel supply conduits 62,63. The gaseous fuel inlet port 53 connects to a fuel chamber 58 that is located in the elongated valve housing 52 and the fuel chamber 58 surrounds a portion of the valve needle 61. The seat 69 is located between the fuel chamber 58 and the chamber 55, so that the gaseous fuel can flow from the fuel chamber 58 to the chamber 55 when the valve needle 61 has lift. From the chamber 55 the gaseous fuel is injected into the combustion chamber of the cylinder 1 via the nozzle holes 56.

The axially displaceable valve needle 61 has a closed position and an open position. In the closed position the axially displaceable valve needle 61 rests on the seat 69. In its closed position the axially displaceable valve needle 61 thus prevents flow from the gaseous fuel inlet port 53 to the nozzle 54. In its open position the axially displaceable valve needle 61 has lift from the seat 69 thereby allowing flow from the gaseous fuel inlet port 53 to the nozzle 54.

A pre-tensioned helical spring 66 acts on the axially displaceable valve needle 61 and biases the valve needle 61 towards its closed position on the seat 69. However, it is understood that other means, such as a gas pressure or oil pressure can be provided to bias the valve needle 61 towards its closed position. In an embodiment, one end of the helical spring 66 engages the rear end of the elongated valve housing 52 and the other end of the helical spring 66 engages a widened section or flange 83 at the rear end of the valve needle 61, whereby the rear end of the valve needle 61 is formed by an actuation piston 64.

The gaseous fuel valve 50 is provided with an actuator system for controllably moving the axially displaceable valve needle 61 between its closed position and its open position. In this embodiment the actuator system includes an axially displaceable actuation piston 64 that is slidably received in a cylindrical portion of the elongated valve housing 52. The actuation piston 64 defines together with the elongated valve housing 52 an actuation chamber 74. In this embodiment the actuation piston 64 is an integral and rearmost part of the axially displaceable valve needle 61. However, it is understood that the actuation piston 64 can be operably connected to the valve needle 61 in various ways, such as by a threaded connection, or by welding and preferably the actuation piston moves 64 in unison with the valve needle 61, although this is not a prerequisite.

The actuation chamber 74 is fluidly connected to a control oil port 72 via a control oil conduit 70. The control oil port 72 is connected to an electronic control oil valve 96 (FIG. 4) that is in turn connected to a source of high-pressure control oil 97. The electronic control oil valve 96 is preferably of the on/off type and receives an electric control signal from the electronic control unit ECU to control the injection events.

In other embodiments (not shown) the valve needle can be actuated by other actuation means, such as a solenoid or a linear electric motor.

The actuation piston 64 is provided with a preferably concentric cylinder that opens towards the rear end of the housing and a stationary piston 87 is slidably received inside this cylinder. The actuation piston 64 is displaceable relative to the stationary piston 87. The cylinder inside the actuation piston 64 defines a chamber 80 together with the stationary piston 87 that provides space for actuation piston 64 to move axially.

The elongated valve housing 52 is provided with an ignition liquid port 78 for connection to the source of ignition liquid 57. An ignition liquid supply conduit 76 extends axially in the elongated valve housing and through the stationary piston 87 and fluidly connects the ignition liquid port 78 to the chamber 80.

Figure 8:
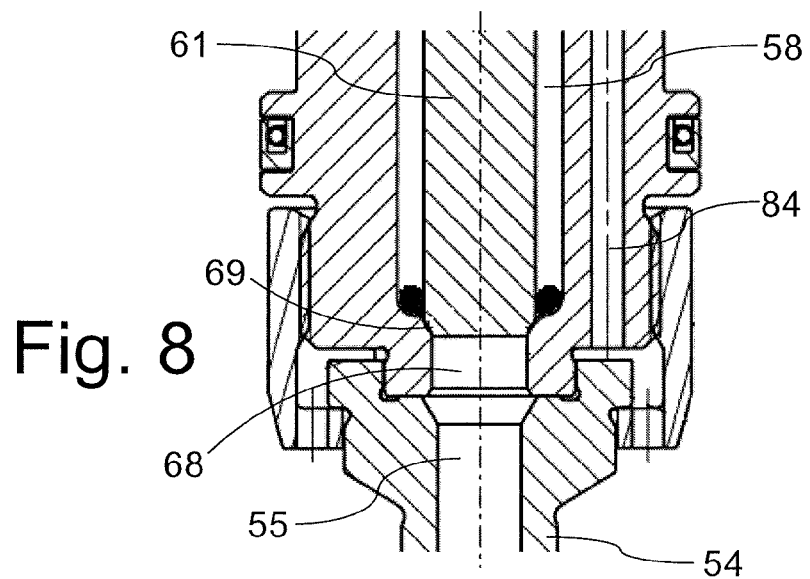
FIG. 8 is a detailed sectional view of another example embodiment of a gaseous fuel injection valve for use in the engine shown in FIG. 1.

A second portion of the ignition liquid delivery conduit extends to coaxially in the valve needle as a bore 82. Radial channels 85 extend in the axially displaceable valve needle 61 from the bore 82 to the outer surface of the axially displaceable valve needle 61 from a port for allowing ignition liquid to be supplied to the clearance between the elongated valve housing 52 and the axially movable valve needle 61 to thereby lubricate and seal the valve needle 61, thus allowing the ignition liquid to be used as sealing oil. The ignition liquid flows through the clearance both upwards to the actuation chamber 74 and downwards to the fuel chamber 58. The portion of the ignition liquid that flows to the actuation chamber 74 mixes with the control oil. This has no substantial effect on the control oil. The portion of the ignition liquid that flows to the fuel chamber 58 and accumulates at the bottom of the fuel chamber 58 i.e. just above the valve seat 69 while the axially movable valve needle 61 rests on the valve seat 69, as shown in FIG. 8.

The dimensions of the clearance are precisely controlled and selected so that the appropriate amount of ignition liquid is collected at the bottom of the fuel chamber 58 in the time during an engine cycle where the axially movable valve member 61 rests on the valve seat 69. An appropriate amount of ignition oil is the amount that is sufficient for creating a reliable and stable ignition, may for example be in the range of 0.2 mg to 200 mg, depending e.g. on the engine size and load. The dimensions of the clearance are chosen such in relation to the properties of the ignition liquid, such as e.g. viscosity, that a constant flow of ignition liquid of an appropriate magnitude is achieved when the source of ignition liquid has a pressure that is a margin above the pressure of the source of gaseous fuel.

A gas leak detection channel 84 in the elongated valve housing 52 leads to a gas leak detection port 86 for detection of gas leaks.

The injection event of the gaseous fuel is controlled by the electronic control unit ECU through the length of the opening time of the gaseous fuel valve 50, i.e. the amount of gas injected in one injection event is determined by the length of the opening time. Thus, upon a signal from the electronic control unit ECU the control oil pressure is raised in the actuation chamber 74 and the valve needle 61 is lifted from the seat 69 in a movement from its closed position to its open position. The valve needle 61 will always performs the full stroke from its closed position to its open position when the control oil pressure is raised and the increased pressure in the actuation chamber 74 urges the actuation piston 64 against the force of the helical spring 66 in axial direction away from the nozzle 54 and the seat 69.

The ignition liquid accumulated at the bottom of the fuel chamber 58 (FIG. 8) enters the chamber 55 in the nozzle 54 first, followed by the gaseous fuel, i.e. the gaseous fuel pushes the ignition liquid ahead and into the chamber 55. Thus, the ignition liquid that was accumulated in the combustion chamber 58 will enter the chamber 55 in the nozzle 54 just ahead of the gaseous fuel. At the moment just before the opening of the fuel valve 50, the chamber 55 is filled with a mixture of compressed hot air and residual unburned gaseous fuel, due to the compression of the scavenging air in the combustion chamber (the nozzle holes 56 allow flow of air from the combustion chamber into the chamber 55). Thus, shortly after the opening of the fuel valve 50 there is hot compressed air, ignition liquid and gaseous fuel present inside chamber 55. This leads to controlled and repeatable ignition of the gaseous fuel already inside the hollow nozzle 54.

Figure 12:
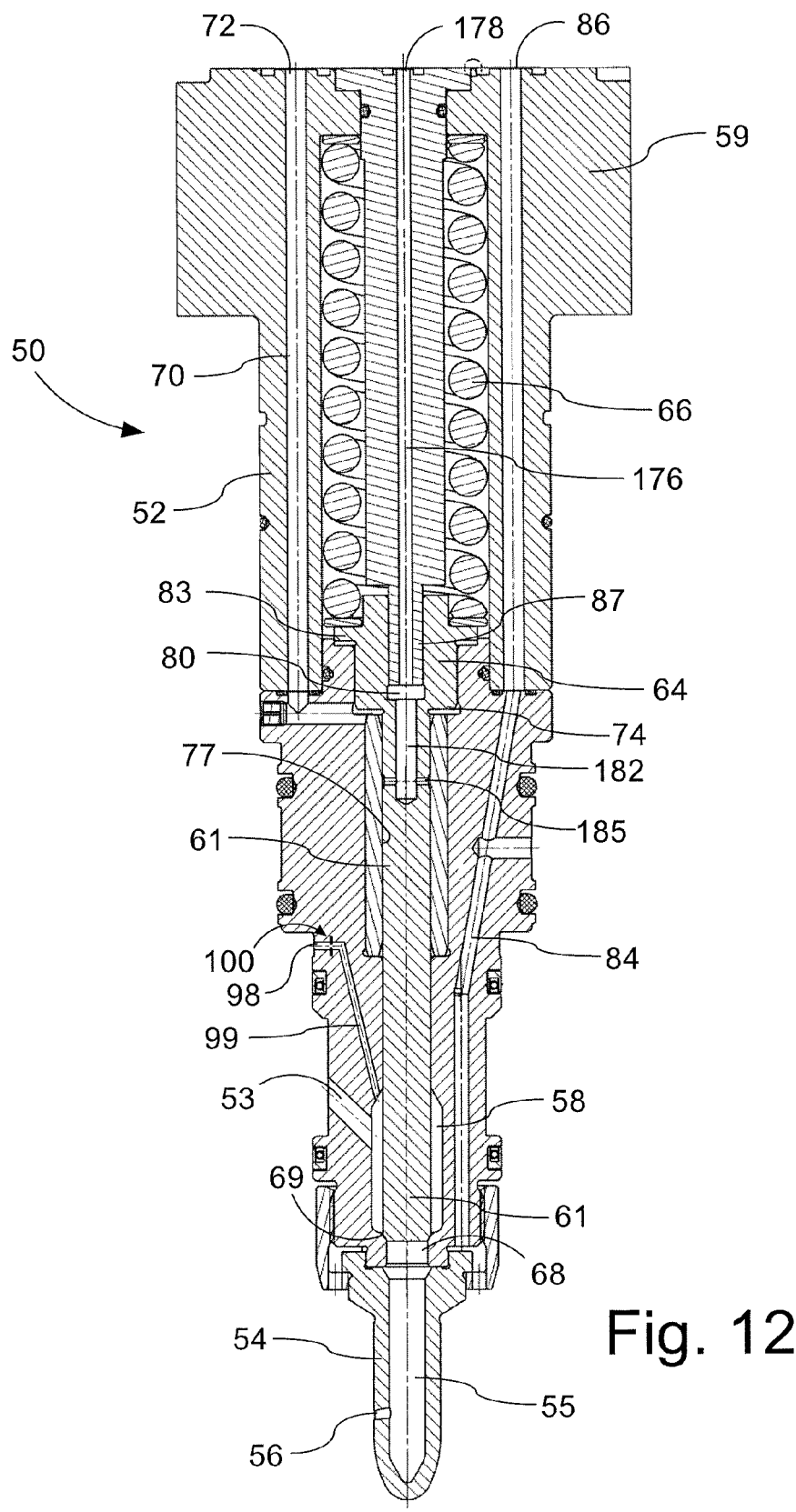
FIG. 12 is a sectional view of a gaseous fuel injection valve according to another embodiment.

FIG. 12 shows another embodiment of the fuel valve 50, that is essentially identical to the embodiment of the previous Figs., except that the clearance 77 is such in relation to the viscosity of the sealing oil that is provided from a source of sealing via port 178 and conduit 176, axial bore 182 and radial bores 185 that practically no sealing oil leaks into the combustion chamber. Instead, a separate combustion liquid channel 99 connects the fuel chamber 58 to ignition liquid port 98. The combustion liquid channel 99 includes a fixed restriction 100, for example in the form of a fixed orifice restriction in order to throttle and control the amount of ignition liquid that is delivered to the fuel chamber 58 during the closed period of the axially movable the valve needle 61.

Ignition liquid port 98 is connected to a source of high pressure ignition liquid with a pressure that is a margin above the pressure of the source of gaseous fuel. The operation of the valve according to the embodiment of FIG. 12 is essentially identical to the operation of the fuel valve described with the previous Figs.

Figure 13:
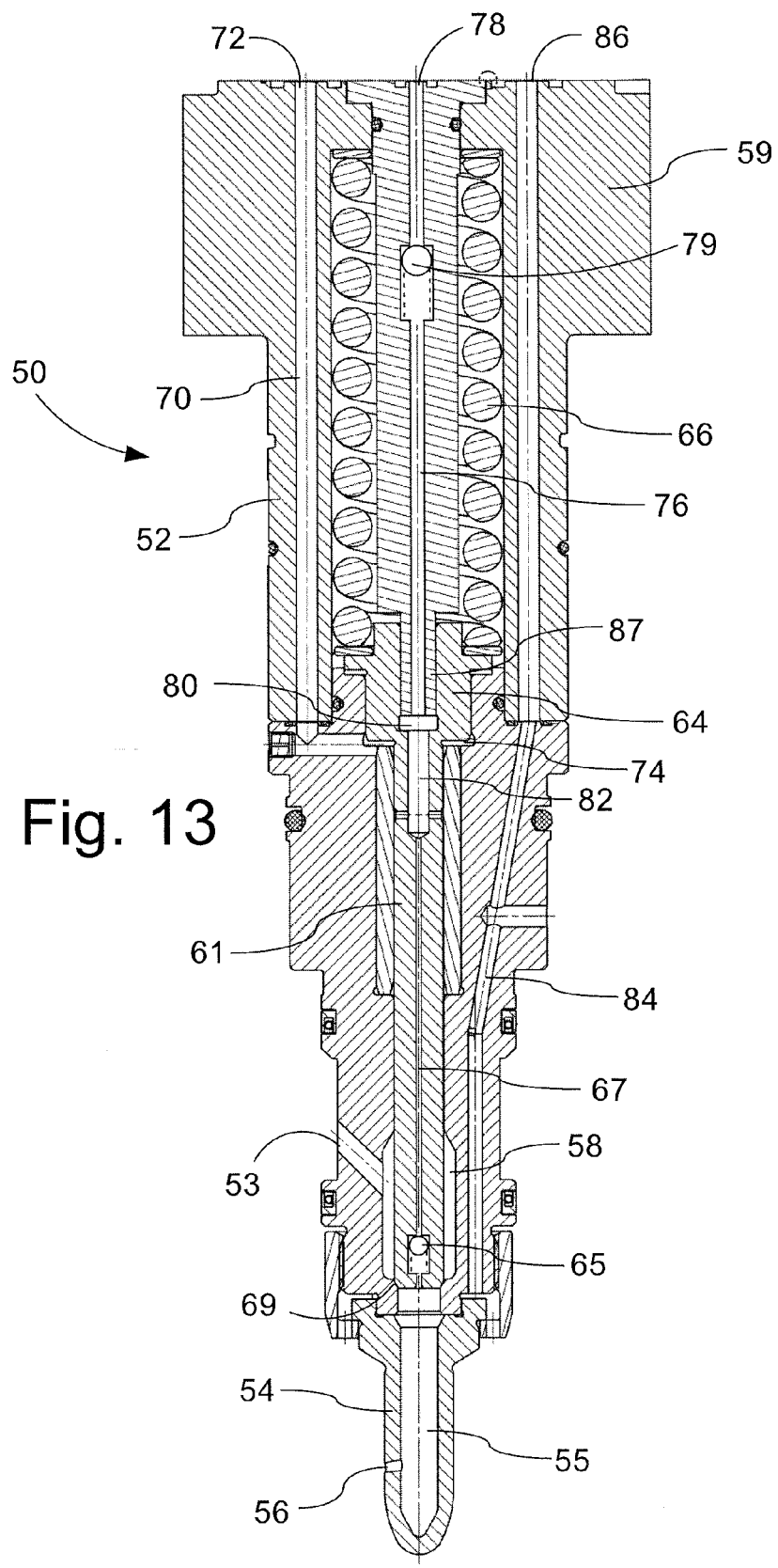
FIG. 13 is a sectional view of a gaseous fuel injection valve according to yet another embodiment.
Figure 14:
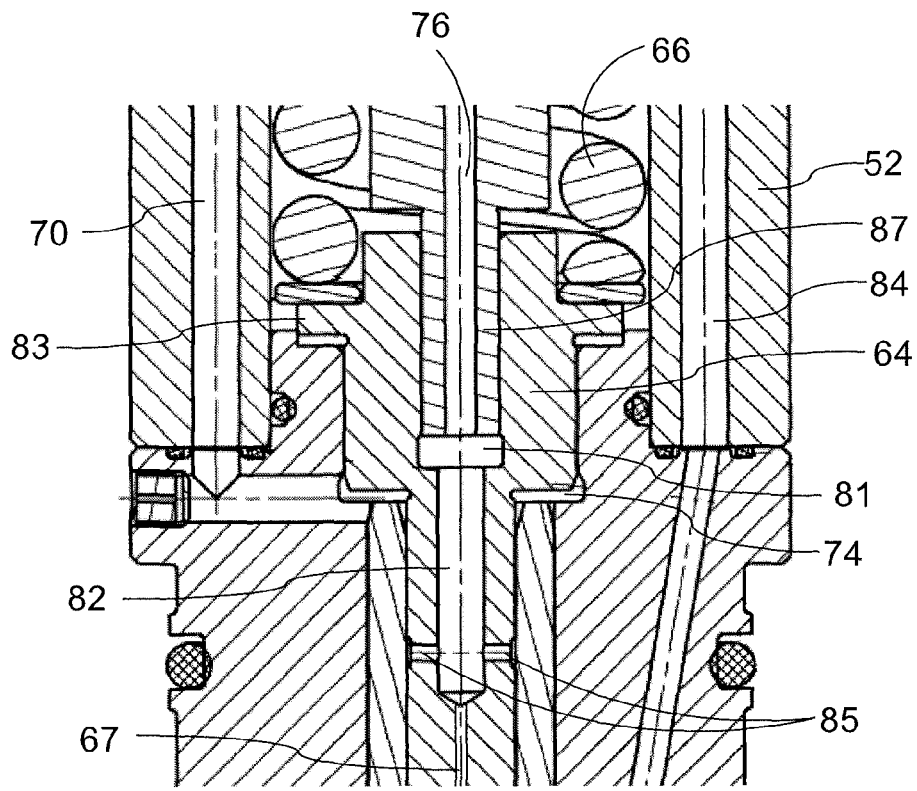
FIG. 14 is a detailed view of a section of FIG. 13.

FIGS. 13 and 14 illustrate another example embodiment of a fuel valve. This embodiment is essentially identical to the embodiment shown with reference to FIGS. 6 to 8, except that a dedicated pump assembly is included in the ignition fuel supply line.

Hereto, the cylinder inside the actuation piston 64 defines a pump chamber 80 together with the stationary piston 87. A non-return valve 79 is disposed between the ignition liquid port 78 and the pump chamber 80 for preventing flow from the pump chamber 80 to the ignition liquid port 78.

An ignition liquid injection conduit 67 extends axially inside the axially displaceable needle 61. The pump chamber 80 has an inlet fluidly connected to the ignition liquid port 78 via the ignition liquid supply conduit 76 and an outlet connected to a first end of the ignition liquid injection conduit 67.

The second end of the ignition liquid injection conduit 67 ends at the tip of the axially displaceable valve needle 61 and the second end of the ignition liquid injection conduit 67 is configured to inject ignition liquid into the chamber 55 inside the nozzle 54.

The pump chamber 80 contracts when the axially displaceable valve needle 61 is moved from the closed position to the open position and thereby the actuation piston 64 is moved towards the rearmost end of the housing 52.

The pump chamber 80 expands when the axially displaceable needle 61 is moved from the open position to the closed position because thereby the actuation piston 64 is moved away from the rearmost end of the housing 52.

A second end of the ignition liquid injection conduit 67 is fluidly connected to the nozzle 54 so that ignition liquid is delivered to the nozzle 54 when the pump chamber 80 contracts. When the pump 80 chamber expands the pump chamber is replenished with ignition liquid from the source of ignition liquid 57 via the ignition liquid supply conduit 76.

The gaseous fuel valve 50 comprises a non-return valve 65 disposed in the ignition liquid injection conduit 67 for preventing flow in the ignition liquid injection conduit towards the pump chamber 80.

The ignition liquid supply conduit 76 extends in the housing 52 and axially through the stationary piston 87 to fluidly connect the ignition liquid port 78 to the pump chamber 80.

Radial sealing channels 85 extend in the axially displaceable valve needle 61 from the ignition liquid injection conduit 67 to the outer surface of the axially displaceable valve needle 61 to allow ignition liquid to be supplied to the gap between the housing 52 and the valve needle to thereby lubricate and seal the valve needle 61, thus allowing the ignition liquid to be used as sealing oil.

The injection event of the gaseous fuel is for all embodiments controlled by the electronic control unit ECU through the length of the opening time of the gaseous fuel valve 50.

Thus, upon a signal from the electronic control unit ECU the control oil pressure is raised in the actuation chamber 74 and the valve needle 61 is lifted from the seat 69 in a movement from its closed position to its open position. The valve needle 61 will always performs the full stroke from its closed position to its open position when the control oil pressure is raised and the increased pressure in the actuation chamber 74 urges the actuation piston 64 against the force of the helical spring 66 in axial direction away from the nozzle 54 and the seat 69.

During this movement the pump chamber 80 contracts and ignition liquid is pressed out of the pump chamber 80 and through the ignition liquid injection conduit 67 ignition liquid is injected from the tip of the axially displaceable valve needle 61 into the chamber 55. Thus, in an embodiment the amount of ignition liquid per injection event is fixed, regardless of the engine load. The stroke of the actuation piston 64 and the diameter of the stationary pump piston 87 determine the amount of ignition liquid delivered in each injection event. Thus, the required volume of ignition liquid needed per injection event is obtained by selecting the appropriate stroke of the actuation piston 64 and the appropriate diameter of the pump piston 87.

At the end of the injection event the ECU removes the pressure from the actuation chamber and the force of the helical spring 66 causes the valve needle 61 to return to the valve seat 69.

Figure 15:
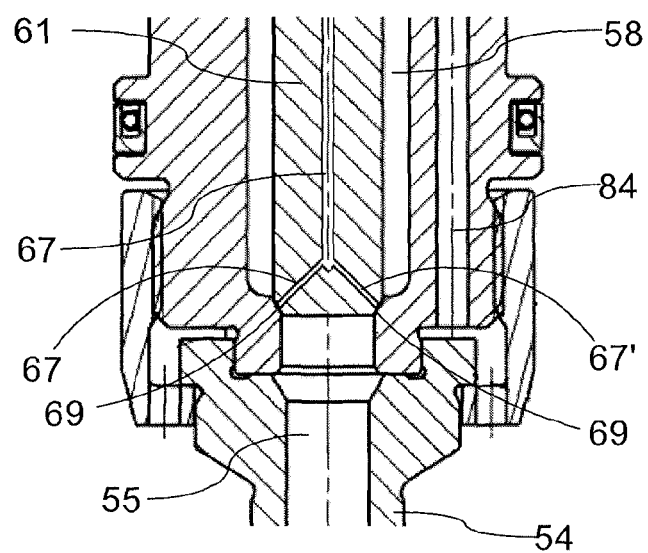
FIG. 15 is a detailed sectional view of another example embodiment of a gaseous fuel injection valve for use in the engine shown in FIG. 1.

The embodiment shown in FIG. 15 is essentially identical to the embodiment of FIGS. 13 and 14, except that the ignition liquid injection conduit 67 splits near the tip of the valve needle 61 into two channels 67' that both end on the seat 69 so that the fluid connection between the pump chamber 80 and the nozzle 54 is closed when the axially displaceable valve needle 61 rests on the seat 69. Thus, this embodiment can do without the non-return valve that prevents flow from the second end of the ignition liquid injection conduit 67 towards the pump chamber 80.

In and embodiment (not shown) the actuation means comprises a solenoid or linear electric motor and a piston and control oil is not needed.

The self-igniting internal combustion engine is operated by supplying pressurized gaseous fuel at a first high pressure to a fuel valve 50 of the engine. The ignition liquid is supplied at a second high pressure to the fuel valve 50. The second high pressure is higher than the first high pressure. The injection of gaseous fuel is controlled with a moveable valve needle 61 that cooperates with a valve seat 69 above the hollow nozzle 54. A fuel chamber 58 is arranged above the valve seat 69. The fuel chamber 58 is pressurized with gaseous fuel. A small continuous flow of ignition liquid is delivered to the fuel chamber 58 and the ignition liquid is accumulated above the valve seat 69 during periods where the valve needle 61 rests on the valve seat 69. A gaseous fuel injection event is started by lifting the axially movable valve needle 61 from the valve seat 69, thereby causing the accumulated ignition liquid to enter the hollow injection nozzle 54 just ahead of the gaseous fuel. The gaseous fuel then ignites inside the nozzle 54 with the help of the ignition liquid, i.e. a controlled ignition.

The engine is configured to self-ignite the injected gaseous fuel with the help of the ignition liquid and without the use of other ignition equipment.

The engine is configured to ignite the gaseous fuel upon entry of the gaseous fuel into a chamber inside a nozzle.

In an embodiment the nozzle 54 is kept above 300° C. throughout the engine cycle. In an embodiment the temperature inside the hollow nozzle 54 is approximately 600 degrees C. at the end of the compression stroke.

It is an advantage of the invention that ordinary vessel or engine lubricating or fuel oils such as sealing oil, marine diesel, biodiesel, lubricating oil, heavy fuel oil or dimethyl ether (DME) may find additional use also as ignition liquid according to the present invention.

Accordingly there is described in a fifth aspect of the present invention the use of vessel or engine lubricating or fuel oil as ignition liquid in a method for injecting and igniting gaseous fuel in a self-igniting internal combustion engine with a fuel valve 50 for injecting gaseous fuel into the combustion chamber of the self-igniting internal combustion engine, the fuel valve comprising a nozzle 52 with a hollow interior that forms a chamber 55 and nozzle holes 56 connecting to the chamber 55, the method comprising: delivering high pressure gaseous fuel to the fuel valve 50, starting an injection event by timed opening of the fuel valve 50 thereby allowing the gaseous fuel to flow to the combustion chamber via the chamber 55 in the nozzle 52, delivering injection liquid to the chamber 55 in the nozzle 52 just before or during an injection event thereby assisting controlled ignition of the gaseous fuel inside the chamber, and ending an injection event by closing the gas valve 50.

In an embodiment of the fifth aspect there is described a method according to the fifth aspect, further comprising delivering the gaseous fuel at a first high pressure to the fuel valve and delivering the ignition fuel at a second high pressure to the fuel valve 50, the second high pressure being higher than the first high pressure.

In an embodiment of the fifth aspect there is described a method according to the fifth aspect, further comprising blending the gaseous fuel and the ignition liquid before the start of an injection event and delivering the gaseous fuel and the ignition liquid simultaneously to the chamber 55.

In an embodiment of the fifth aspect there is described a method according to the fifth aspect, further comprising delivering the gaseous fuel and the ignition liquid separately to the chamber 55.

In an embodiment of the fifth aspect there is described a method according to the fifth aspect, wherein the gaseous fuel ignites inside the chamber 55 with the help of the ignition liquid.

In an embodiment of the fifth aspect there is described a method according to the fifth aspect, wherein the nozzle 54 is kept above 300° C. throughout the engine cycle.

In an embodiment of the fifth aspect the ignition liquid has a viscosity in the range from 25 cSt to 750 cST, preferably between 75 cSt to 725 cSt, and most preferably between 150 cSt to 700 cSt.

In an embodiment of the fifth aspect the ignition liquid has a flash point above 30° C., preferably above 45° C., and most preferably above 60° C.

The term "comprising" as used in the claims does not exclude other elements or steps. The term "a" or an as used in the claims does not exclude a plurality. The electronic control unit may fulfill the functions of several means recited in the claims.

The reference signs used in the claims shall not be construed as limiting the scope.

Although the present invention has been described in detail for purpose of illustration, it is understood that such detail is solely for that purpose, and variations can be made therein by those skilled in the art without departing from the scope of the invention.

The invention claimed is:

1. A fuel valve (50) for injecting gaseous fuel into a combustion chamber of a self-igniting internal combustion engine, said fuel valve (50) comprising:
    an elongated fuel valve housing (52) with a rear end and a front end,
    a nozzle (54) with an elongated nozzle body with a hollow interior that forms a chamber (55) connected to nozzle holes (56), said nozzle (54) being arranged at the front end of said fuel valve housing (52),
    a gaseous fuel inlet port (53) in said elongated fuel valve housing (52) for connection to a source (60) of high pressure gaseous fuel,
    an ignition liquid inlet port (78,98) for connection to a source of ignition liquid (57),
    means (61,69,53,58) for establishing a timed fluidic connection between said gaseous fuel inlet port and said chamber (55), and
    means (61,67,69,76,79,85,98,99,100) configured for a timed delivery of a finite volume of ignition liquid to said chamber (55) for igniting said gaseous fuel inside said chamber (55).

2. A fuel valve according to claim 1, wherein said means (61,67,76,79,85,98,99,100) configured for a timed delivery of a finite volume of ignition liquid to said chamber (55) is configured to deliver a controlled volume of ignition liquid.

3. A fuel valve according to claim 1, wherein said finite and controlled amount of ignition liquid is significantly less than the volume of said chamber (55).

4. A fuel valve according to claim 1, wherein said fuel valve (50) is configured to deliver said finite volume of ignition liquid to said chamber (55) just ahead of the gaseous fuel.

5. A fuel valve according to claim 1, wherein said fuel valve (50) is configured to deliver said finite volume of ignition liquid to said chamber (55) at the start of the delivery of the gaseous fuel.

6. A fuel valve according to claim 1, wherein said finite volume of ignition liquid is added to said gaseous fuel before admission of the gaseous fuel to said chamber (55) and wherein the gaseous fuel and the ignition liquid enter said chamber 55 via one and the same port.

7. A fuel valve according to claim 1, wherein said finite volume of ignition liquid and said gaseous fuel are delivered to said chamber via separate ports.

8. A fuel valve according to claim 1, wherein the chamber (55) has an elongated shape with one longitudinal end forming an inlet port for gaseous fuel and ignition liquid and the nozzle holes (56) connecting to the chamber near the other longitudinal end of the chamber (55).

9. A fuel valve according to claim 1, wherein said nozzle is configured to be operated with a temperature above 300° C.

10. A self-igniting internal combustion engine with a plurality of cylinders (1), a high pressure gaseous fuel supply system, a high pressure ignition liquid supply system and one or more gaseous fuel valves (50) according to any one of claims 1 to 9 provided at the cylinders of the engine and said gaseous fuel valves (50) being connected to said high pressure gaseous fuel supply system and to said ignition liquid supply system.

11. An engine according to claim 10, wherein said engine is configured to self-ignite the injected gaseous fuel with the help of said ignition liquid and without the use of other ignition equipment.

12. An engine according to claim 10, wherein said engine is configured to ignite said gaseous fuel upon entry of the gaseous fuel in the chamber (55) inside a nozzle (54).

13. An engine according to claim 10, wherein said source of gaseous fuel delivers said gaseous fuel at high pressure to said fuel valves (50), and wherein said source of ignition liquid is configured to deliver said ignition liquid at a pressure that is higher than the pressure of said source of gaseous fuel.

14. A method for injecting and igniting gaseous fuel in a self-igniting internal combustion engine with a fuel valve (50) for injecting gaseous fuel into the combustion chamber of said self-igniting internal combustion engine, said fuel valve comprising a nozzle (52) with a hollow interior that forms a chamber (55) and nozzle holes (56) connecting to said chamber (55), said method comprising:
    delivering high pressure gaseous fuel to said fuel valve (50),
    starting an injection event by timed opening of said fuel valve (50) thereby allowing said gaseous fuel to flow to said combustion chamber via said chamber (55) in said nozzle (52),
    delivering injection liquid to said chamber (55) in said nozzle (52) just before or during an injection event thereby assisting ignition of said gaseous fuel inside said chamber, and
    ending an injection event by closing said gas valve (50).

15. A method according to claim 14, further comprising delivering said gaseous fuel at a first high pressure to said fuel valve and delivering said ignition fuel at a second high pressure to said fuel valve (50), said second high pressure being higher than said first high pressure.

16. A method according to claim 14, further comprising blending said gaseous fuel and said ignition liquid before the start of an injection event and delivering the gaseous fuel and the ignition liquid simultaneously to said chamber (55).

17. A method according to claim 14, further comprising delivering the gaseous fuel and the ignition liquid separately to said chamber (55).

18. A method of operating a self-igniting internal combustion engine, said method comprising:
    supplying pressurized gaseous fuel at a first high pressure to a fuel valve (50) of said engine,
    said fuel valve (50) having a hollow nozzle (54) with a plurality of nozzle holes (56) connecting a chamber (55) in said nozzle (54) to a combustion chamber in a cylinder (1) of said engine,
    supplying ignition liquid at a second high pressure to said fuel valve (50), said second high pressure being higher than said first high pressure,
    controlling the injection of gaseous fuel with a moveable valve needle (61) that cooperates with a valve seat (69) above said hollow nozzle (54),
    a fuel chamber (58) being arranged above said valve seat (69),
    pressuring said fuel chamber (58) with said gaseous fuel,
    starting a gaseous fuel injection event by lifting said axially moveable valve needle (61) from said valve seat (69),
    delivering a volume of ignition liquid to said chamber (55) just before or during an injection event, and
    ending said injection event by moving said axially moveable valve needle (61) back to the valve seat (69), wherein said gaseous fuel ignites inside said chamber (55) with the help of said ignition liquid.

19. A method according to claim 18, wherein the nozzle (54) is kept above 300° C. throughout an engine cycle.

20. A use of vessel or engine lubricating or fuel oil as ignition liquid in a method for injecting and igniting gaseous fuel in a self-igniting internal combustion engine with a fuel valve (50) for injecting gaseous fuel into the combustion chamber of said self-igniting internal combustion engine, said fuel valve comprising a nozzle (52) with a hollow interior that forms a chamber (55) and nozzle holes (56) connecting to said chamber (55), said method comprising: delivering high pressure gaseous fuel to said fuel valve (50), starting an injection event by timed opening of said fuel valve (50) thereby allowing said gaseous fuel to flow to said combustion chamber via said chamber (55) in said nozzle (52), delivering injection liquid to said chamber (55) in said nozzle (52) just before or during an injection event thereby assisting controlled ignition of said gaseous fuel inside said chamber, and ending an injection event by closing said gas valve (50).

21. A use according to claim 20, wherein the method further comprises delivering said gaseous fuel at a first high pressure to said fuel valve and delivering said ignition fuel at a second high pressure to said fuel valve (50), said second high pressure being higher than said first high pressure.

22. A use according to claim 20, wherein the method further comprises blending said gaseous fuel and said ignition liquid before the start of an injection event and delivering the gaseous fuel and the ignition liquid simultaneously to said chamber (55).

23. A use according to claim 20, wherein the method further comprises delivering the gaseous fuel and the ignition liquid separately to said chamber (55).

24. A use according to claim 20, wherein the gaseous fuel ignites inside said chamber (55) with the help of said ignition liquid.

25. A use according to claim 20, wherein the nozzle (54) is kept above 300° C. throughout the engine cycle.

26. A use according to claim 20, wherein said ignition liquid has a viscosity in the range from 25 cSt to 750 cST, preferably between 75 cSt to 725 cSt, and most preferably between 150 cSt to 700 cSt.

27. A use according to claim 20, wherein said ignition liquid has a flash point above 30° C., preferably above 45° C., and most preferably above 60° C.

\* \* \* \* \*